United States Patent
Kouchi

(10) Patent No.: US 9,605,827 B2
(45) Date of Patent: Mar. 28, 2017

(54) HEAD LAMP WITH HIDDEN POSITION LAMPS FOR STRADDLE-TYPE VEHICLE

(71) Applicant: KAWASAKI JUKOGYO KABUSHIKI KAISHA, Hyogo (JP)

(72) Inventor: Kaoru Kouchi, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 246 days.

(21) Appl. No.: 14/023,793

(22) Filed: Sep. 11, 2013

(65) Prior Publication Data

US 2014/0071705 A1 Mar. 13, 2014

(30) Foreign Application Priority Data

Sep. 13, 2012 (JP) ................................ 2012-201475

(51) Int. Cl.
*F21S 8/10* (2006.01)

(52) U.S. Cl.
CPC ....... *F21S 48/1388* (2013.01); *F21S 48/1305* (2013.01); *F21S 48/147* (2013.01); *F21S 48/1208* (2013.01); *F21S 48/1233* (2013.01); *F21S 48/155* (2013.01)

(58) Field of Classification Search
CPC .. B62J 6/06; B62J 6/02; B60Q 1/0094; B60Q 1/4841; B60Q 2400/30; F21S 48/1388; F21S 48/1305
USPC ......................................... 362/475–476, 544
See application file for complete search history.

(56) References Cited

U.S. PATENT DOCUMENTS

| | | | | |
|---|---|---|---|---|
| 2002/0191395 A1* | 12/2002 | Fleury | ..................... | F21V 13/12 362/236 |
| 2006/0056193 A1* | 3/2006 | Mochizuki | ........... | B60Q 1/0041 362/517 |
| 2007/0236949 A1* | 10/2007 | Kurihara | .............. | B60Q 1/0041 362/475 |
| 2009/0040779 A1* | 2/2009 | Ohzono | ............... | B60Q 1/0041 362/516 |
| 2009/0168428 A1* | 7/2009 | Huang | ................. | F21S 48/1159 362/294 |
| 2011/0051443 A1* | 3/2011 | Nishijima | ............ | B60Q 1/0041 362/475 |

FOREIGN PATENT DOCUMENTS

| | | |
|---|---|---|
| JP | 2003-81154 | 3/2003 |
| JP | 2006-82657 | 3/2006 |
| JP | 2011-255820 | 12/2011 |

* cited by examiner

*Primary Examiner* — Sean Gramling
*Assistant Examiner* — Gerald J Sufleta, II
(74) *Attorney, Agent, or Firm* — Wenderoth, Lind & Ponack, L.L.P.

(57) ABSTRACT

A head lamp unit for vehicle includes a head lamp and a position lamp housed in a housing, in which a cover lens is mounted on the front surface of a lamp body. A position lamp emitter is arranged to be hidden by a head lamp reflector, seen from the front. A position lamp reflection surface reflecting a light emitted from the position lamp emitter to guide the light to the front of the housing is provided around the head lamp reflector.

9 Claims, 9 Drawing Sheets

HEAD LAMP WITH HIDDEN POSITION LAMPS FOR STRADDLE-TYPE VEHICLE

BACKGROUND OF INVENTION

1. Field of the Invention

The present invention relates to a head lamp unit for vehicle which houses a head lamp and a position lamp in one head lamp housing.

2. Description of the Prior Art

FIG. 9 shows an example of a conventional head lamp unit for a motorcycle (Japanese Patent Application Laid-Open (JP-A) No. 2003-81154). A lamp body 101 and a cover lens 102 covering the front surface of the lamp body 101 configure a head lamp housing. The head lamp housing houses left and right head lamps 105, and left and right position lamps 106. FIG. 9 shows a half cross-sectional view of the left and right parts and shows the head lamp 105 and the position lamp 106 only in the cross-sectional region.

The head lamp 105 includes a head lamp emitter (bulb) 110, and a head lamp reflector 111 in cup shape. The position lamp 106 includes a position lamp emitter (bulb) 115, and a position lamp reflector 116.

Seen from the front, the position lamp emitter 115 and the position lamp reflector 116 are arranged outward of the outer peripheral edge of the head lamp reflector 111. That is, the position lamp emitter 115 and the position lamp reflector 116 are arranged to be seen in its entirety through the cover lens 102 from the front.

In the head lamp unit in FIG. 9, the position lamp 106 is arranged in the housing to be seen in its entirety from the front together with the head lamp 105, and is noticeable so that the inside of the head lamp unit looks complicated. It is thus difficult to maintain clear appearance or well organized appearance. In addition, the head lamp unit extends in its entirety in the left-right direction (or in the up-down direction) to be difficult to be compact.

SUMMARY OF THE INVENTION

The present invention has been made in view of the above problems, and an object of the present invention is to provide a head lamp unit housing a head lamp and a position lamp in the same housing, which can maintain clear appearance, seen from the front, and can reduce the left-right or up-down dimension of the entire head lamp unit.

The present invention provides a head lamp unit for a vehicle including: a housing including a lamp body and a cover lens mounted on the front surface of the lamp body; a head lamp housed in the housing; a position lamp housed in the housing; a head lamp reflector arranged in the housing; a position lamp emitter arranged in the housing and hidden by the head lamp reflector, seen from the front; and a position lamp reflection surface arranged around the head lamp reflector and reflecting a light emitted from the position lamp emitter to guide the light toward the front of the housing.

Preferably, the head lamp unit of the present invention can be configured as follows.

(a) A design cover for covering the periphery of the head lamp reflector from the front is arranged in the housing, the design cover being formed with the position lamp reflection surface.

(b) The position lamp reflection surface has a first reflection surface in concave surface shape covering the position lamp emitter from the rear to guide a reflected light toward the front, and a second reflection surface detouring a reflected light from the first reflection surface around the head lamp reflector to guide the reflected light inward of the range of the head lamp reflector, seen from the front. In this case, more preferably, left and right head lamp emitters and left and right position lamp emitters are arranged, the position lamp emitters being arranged behind left and right ends of the head lamp reflector.

(1) According to the present invention, the position lamp emitter is hidden by the head lamp reflector from the front. Therefore, the position lamp emitter can be prevented from being noticeable to improve the appearance of the head lamp unit, seen from the front. In addition, the space behind the head lamp reflector in the housing can be effectively used for arranging the position lamp emitter. Therefore, the left-right width or the up-down width of the head lamp unit can be reduced.

(2) According to configuration (a), the position lamp reflector is formed on the existing design cover. Therefore, the number of position lamp reflector components can be reduced. In addition, it is unnecessary to provide position lamp cut (refracting portion) in the cover lens.

(3) According to configuration (b), even when the position lamp emitter is hidden by the head lamp reflector, the cooperation of the first reflection surface and the second reflection surface can guide a light from the position lamp emitter toward the front and obliquely inward of the range of the head lamp reflector. In this case, left and right head lamp emitters and left and right position lamp emitters are arranged, the position lamp emitters being arranged behind left and right ends of the head lamp reflector. The head lamp unit can thus be further smaller.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

FIGS. 1 to 8 show a head lamp unit for a motorcycle according to the present invention. An embodiment of the present invention will be described with reference to these drawings.

Figure 1:
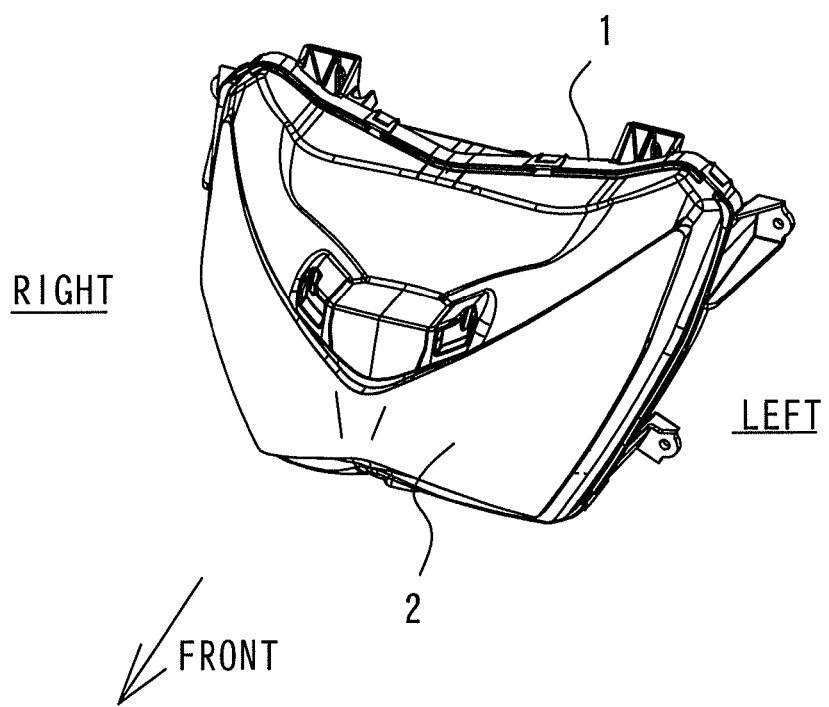
FIG. 1 is a perspective view of a head lamp unit for motorcycle according to the present invention, seen from the left, front, and top.

FIG. 1 is a perspective view of the head lamp unit, seen from the left, front, and top. A transparent forward-projecting cover lens 2 is fixed to the front surface of a metal or resin lamp body 1. The lamp body 1 and the cover lens 2 configure the housing of the head lamp unit. The cover lens 2 is formed in mountain shape so that the center of the left-right width thereof is an apex in plan view.

Figure 2:
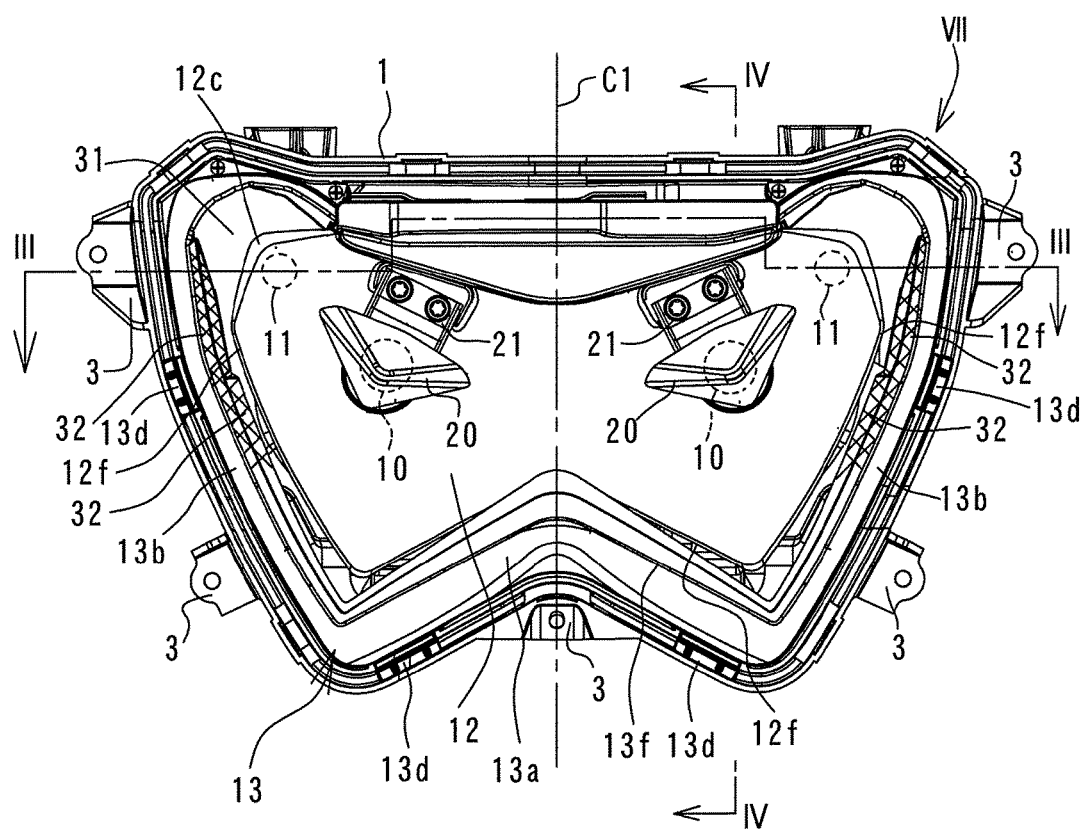
FIG. 2 is a front view of the head lamp unit in FIG. 1 in which a cover lens is removed.

FIG. 2 is a front view of the head lamp unit in which the cover lens 2 is removed. The outer peripheral shape of the lamp body 1, seen from the front, has left-right symmetry so that the lower, left, and right sides thereof are formed in W-shape and the upper side thereof substantially horizontally connects the left upper end thereof and the right upper end thereof. Specifically, seen from the front, the lower side is formed in "mountain shape" or "inverted V shape", and the left and right sides extend upward to be inclined outward in the left-right direction from the left and right ends of the lower side. A plurality of body mounting sections 3 are formed on the left, right, and lower sides of the lamp body 1, and are fixed via brackets to the front end of the vehicle with bolts.

As emitting members, left and right head lamp emitters 10, left and right position lamp emitters 11, a head lamp reflector 12, and a design cover 13 are arranged in the housing.

The head lamp emitters 10 are symmetrical with respect to center line C1 of the left-right width of the lamp body 1. Hollow triangular pyramid shield caps 20 are arranged in front of the head lamp emitters 10. The shield caps 20 are mounted on the head lamp reflector 12 via mounting brackets 21.

The lower, left, and right sides of the outer peripheral shape of the head lamp reflector 12, seen from the front, are formed in a W-shape, and are opposite to the lower, left, and right sides of the W-shape of the lamp body 1 from the inside at substantially uniform intervals. The left upper end and the right upper end of the head lamp reflector 12 cover the left and right position lamp emitters 11 from the front. In other words, the left and right position lamp emitters 11 are arranged behind the left upper end and the right upper end of the head lamp reflector 12 to be hidden by the left upper end and the right upper end of the head lamp reflector 12, seen from the front.

The design cover 13 is formed in a W-shape to cover the space between the lower, left, and right sides of the W-shape of the head lamp reflector 12 and the lower, left, and right sides of the W-shape of the lamp body 1 from the front. By providing the design cover 13, the step in the front-rear direction between the front surface of the lamp body 1 and the head lamp reflector 12 can be prevented from being noticeable to improve the appearance. In addition, the reinforcing ribs and the bolt holes formed in the front surface of the lamp body 1 are hidden by the design cover 13. In this respect, the appearance can be improved.

Figure 4:
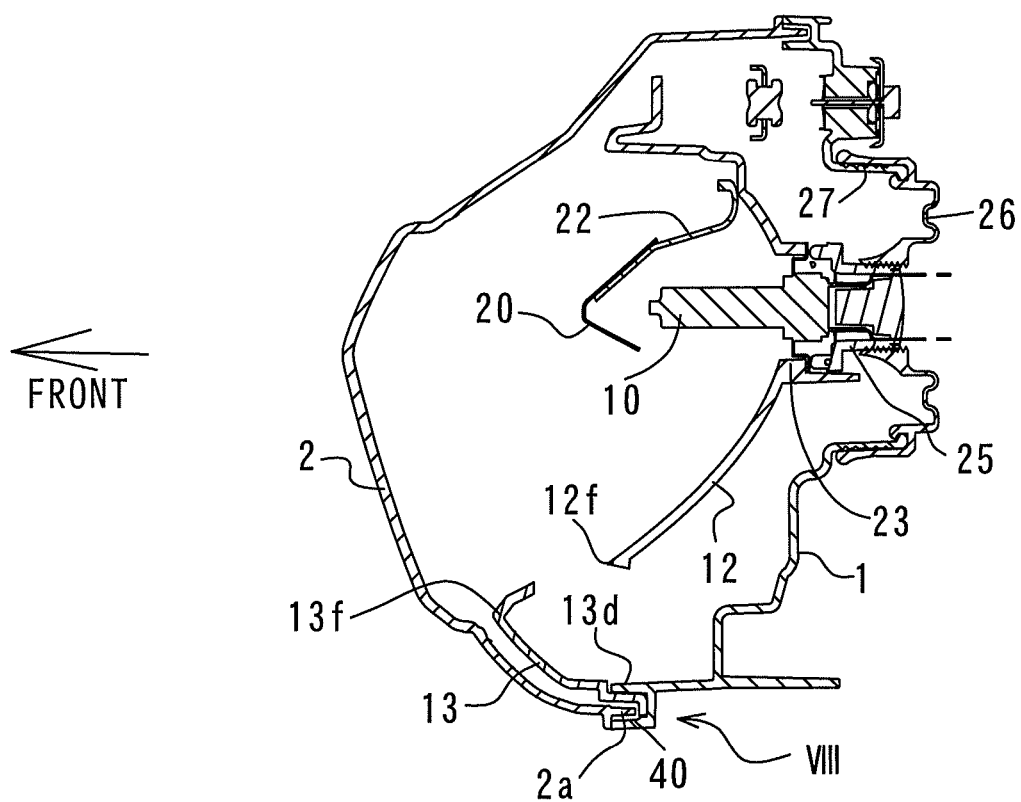
FIG. 4 is a cross-sectional view taken along line IV-IV in FIG. 2.

FIG. 4 is a cross-sectional view taken along line IV-IV in FIG. 2. The design cover 13 has a forward-projecting portion projecting forward of the head lamp reflector 12. The apex of a forward-projecting portion (front end portion) 13f extends along an edge 12f of the head lamp reflector 12 (see FIG. 2).

Figure 3:
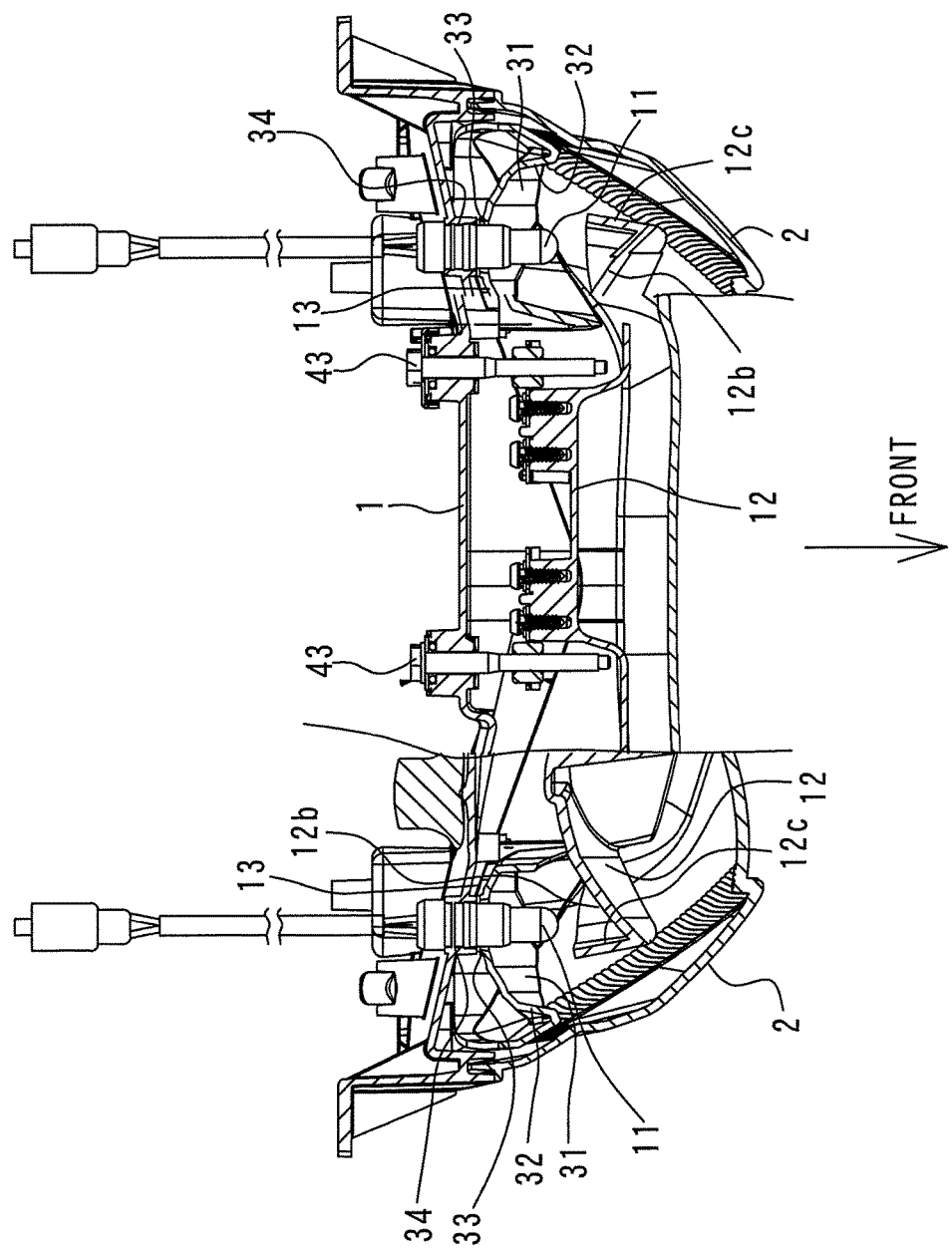
FIG. 3 is a cross-sectional view taken along line III-III in FIG. 2.

FIG. 3 is a cross-sectional view taken along line III-III in FIG. 2. The design cover 13 has a portion extending to the rear of the head lamp reflector 12 near the position lamp emitters 11. Further, near the position lamp emitters 11, the design cover 13 has a portion routed around the rear of the head lamp reflector 12, and the portion of the design cover 13 is positioned with a gap in the direction perpendicular to the front-rear direction with respect to the head lamp reflector 12.

In FIG. 4, the vertical cross-sectional shape of the head lamp reflector 12 is formed in concave shape, and an emitter insertion hole 23 is formed in the rearmost portion (rear end) of the head lamp reflector 12. Each of the head lamp emitters 10 is removably inserted from the rear into the emitter insertion hole 23, and projects into the head lamp reflector 12. The rear end of the head lamp emitter 10 is screwed onto a disc-like threaded mounting cover 26 via an emitter holder 25. The mounting cover 26 is screwed into the outer peripheral thread of a tubular emitter mounting hole 27 formed in the lamp body 1.

Figure 5:
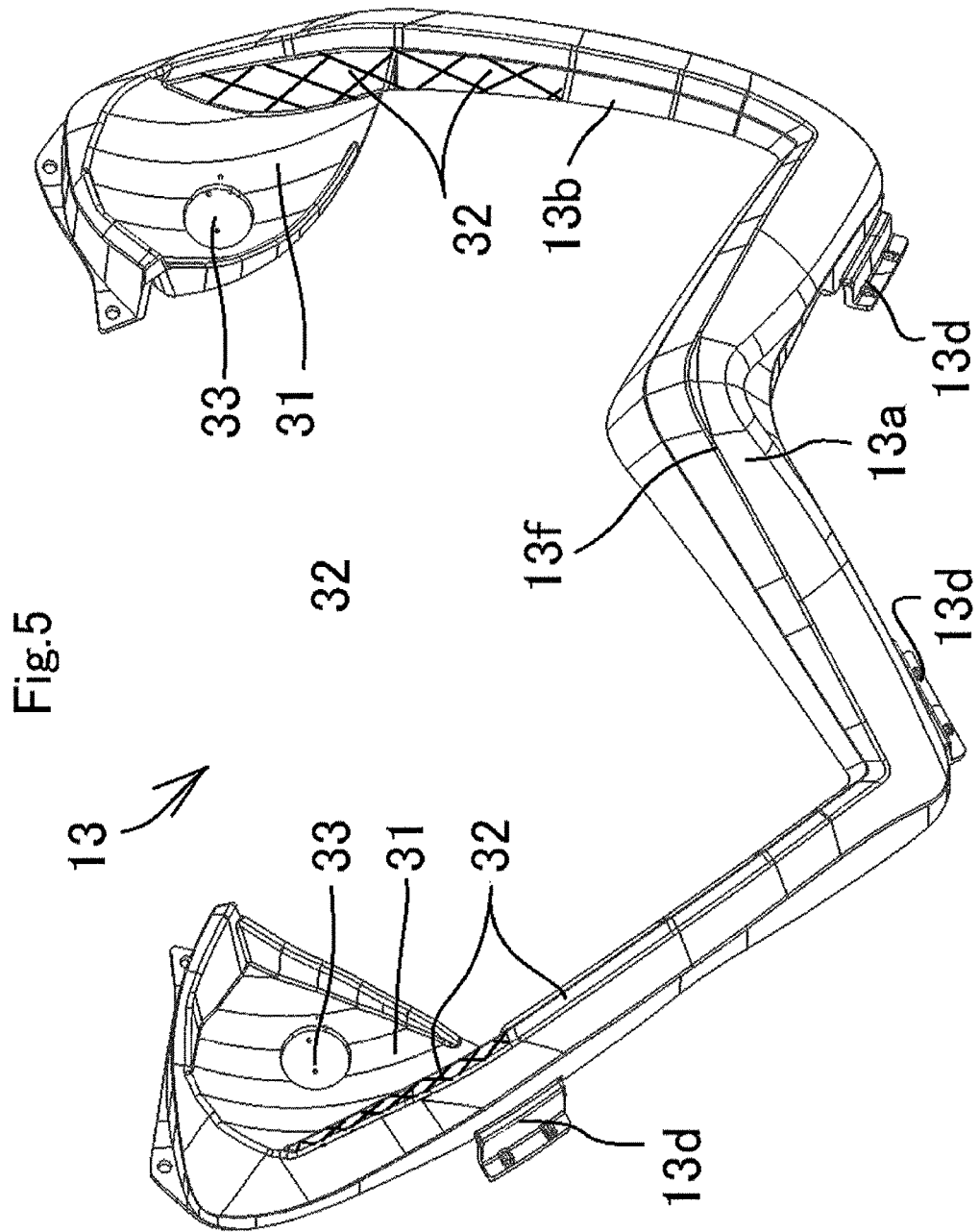
FIG. 5 is a perspective view of a design cover of the head lamp unit in FIG. 1.

FIG. 5 is a perspective view of the design cover 13. The design cover 13 in a W-shape has, as position lamp reflection surfaces, left and right first reflection surfaces 31 in a cup shape (concave surface shape), and left and right second reflection surfaces 32 in plane shape. The reflection surfaces 31 and 32 are mirror-finished by chromeplating. In FIGS. 2 and 5, to clear the second reflection surfaces 32, the regions are cross-hatched.

The first reflection surfaces 31 in cup shape are formed at the upper ends of left and right side portions 13b of the design cover 13. Emitter insertion holes 33 are formed in the rearmost portions of the first reflection surfaces 31, and the position lamp emitters 11 are inserted into the emitter insertion holes 33.

The second reflection surfaces 32 are formed on the inner side surfaces of the upper half portions of the left and right side portions 13b, and extend from the regions adjacent to the outward edges of the left and right first reflection surfaces 31 to the substantially center positions in the up-down direction of the left and right side portions 13b. A plurality of mounting sections 13d of L-shaped cross section are provided at the outer peripheral end of the design cover 13 to fix the design cover.

In FIG. 2, the second reflection surfaces 32 are arranged outside in the vehicle width direction with respect to the edges 12f of the head lamp reflector 12, and extend in the up-down direction along the edges 12f of the head lamp reflector 12. In this way, since the second reflection surfaces 32 for the position lamps are shifted from the head lamp reflector 12, the emission for the position lamps can be easily identified even at the time of emission of the head lamps.

In FIG. 3, in the lamp body 1, left and right position lamp emitter mounting holes 34 are formed at a position corresponding to the position lamp emitter insertion holes 33. Inner peripheral threads are formed in the emitter mounting holes 34 to screw the position lamp emitters 11 thereinto from the rear. The position lamp emitters 11 which are screwed into the emitter mounting holes 34 extend through the emitter insertion holes 33 in the design cover 13 to project into the second reflection surfaces 32.

The position lamp emitters 11 are covered in their entirety by the head lamp reflector 12, seen from the front. The first reflection surfaces 31 are formed in cup shape. The one-half or larger regions of the first reflection surfaces 31 are exposed outward of the head lamp reflector 12, seen from the front.

Folded portions 12c in visor shape are formed at the outer peripheral ends at the left upper end and the right upper end of the head lamp reflector 12 to hide the position lamp emitters 11 from the front and obliquely top. In addition, back surfaces 12b at the left upper end and the right upper end of the head lamp reflector 12 are preferably mirror-finished to reflect forward-traveling lights emitted from the position lamp emitters 11 toward the rear or the obliquely rear.

The intermediate portion between the left upper end and the right upper end of the head lamp reflector 12 is connected to the lamp body 1 to be movable in the front-rear direction by left and right adjust bolts 43. That is, by rotating the adjust bolts 43, the upper ends of the head lamp reflector 12 are moved and adjusted in the front-rear direction, so that the forward-emitting direction (the height and/or the left and right) of the head lamps can be changed.

Figure 7:
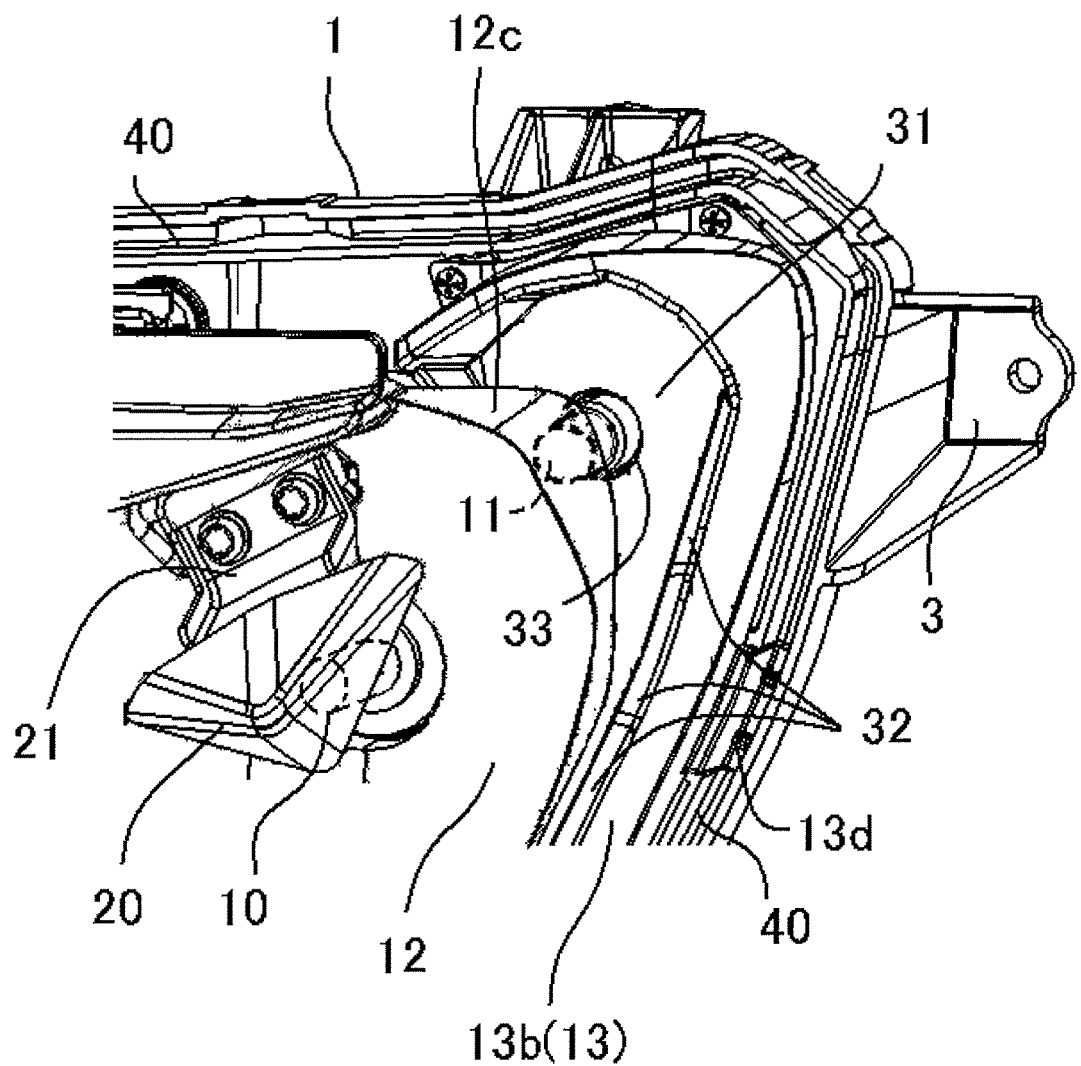
FIG. 7 is an enlarged perspective view of the portion indicated by arrow VII in FIG. 2.

FIG. 7 is an enlarged perspective view of the portion indicated by arrow VII in FIG. 2. Each of the first reflection surfaces 31 in cup shape has a set curving degree to reflect a light emitted from each of the position lamp emitters 11 to substantially the front. On the other hand, each of the second reflection surfaces 32 is set to guide a light which is directly received from the position lamp emitter 11 and a reflected light from the first reflection surface 31 toward the front and inward in the left-right direction so that those lights come into a front space of the head lamp reflector 12. That is, each of the second reflection surfaces 32 is set to guide those lights into the range of the head lamp reflector 12, seen from the front.

Specifically, the reflected light is detoured and reflected by the second reflection surface 32 at an angle of substantially 80° to the surface in the front-rear direction.

Figure 8:
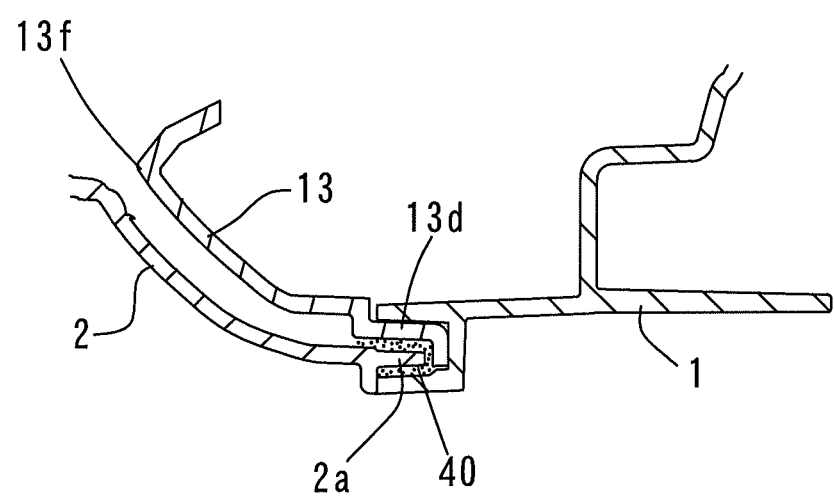
FIG. 8 is an enlarged cross-sectional view of the portion indicated by arrow VIII in FIG. 4.
Figure 9:
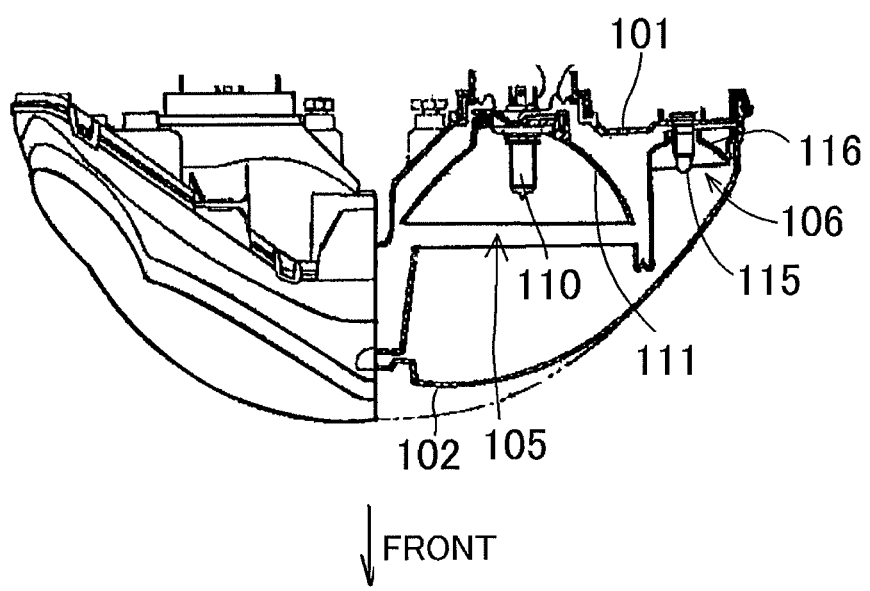
FIG. 9 is a cross-sectional view of a conventional example.

FIG. 8 is an enlarged cross-sectional view of the portion indicated by arrow VIII in FIG. 4. At the outer peripheral end of the lamp body 1, a mounting groove 40 opened to the front is formed over the entire periphery of the lamp body 1. Each of the L-shaped mounting sections 13d of the design cover 13 and each of linear projections 2a formed at the outer peripheral end of the cover lens 2 are fitted into the mounting groove 40, and are fixed with an adhesive filled in the mounting groove 40. The linear projection 2a of the cover lens 2 presses the folded portion at the end of the L-shaped mounting section 13d onto the bottom of the mounting groove 40.

[The Operation of the Embodiment and Maintenance Operation]

In FIG. 3, of lights emitted from the position lamp emitters 11, the reflected lights reflected to the front by the first reflection surfaces 31 and parts of the lights which are directly emitted from the position lamp emitters 11 to the front are reflected by the second reflection surfaces 32, and are guided to the front and inward in the left-right direction. That is, those lights are guided toward the front of the head lamp reflector 12 and into the range of the head lamp reflector 12, seen from the front. In addition, parts of lights which are emitted from the position lamp emitters 11 to the front to abut onto the back surfaces 12b in mirror surface shape of the head lamp reflector 12 are reflected to the rear to be reflected to the front and inward by the first reflection surfaces 31.

Figure 6:
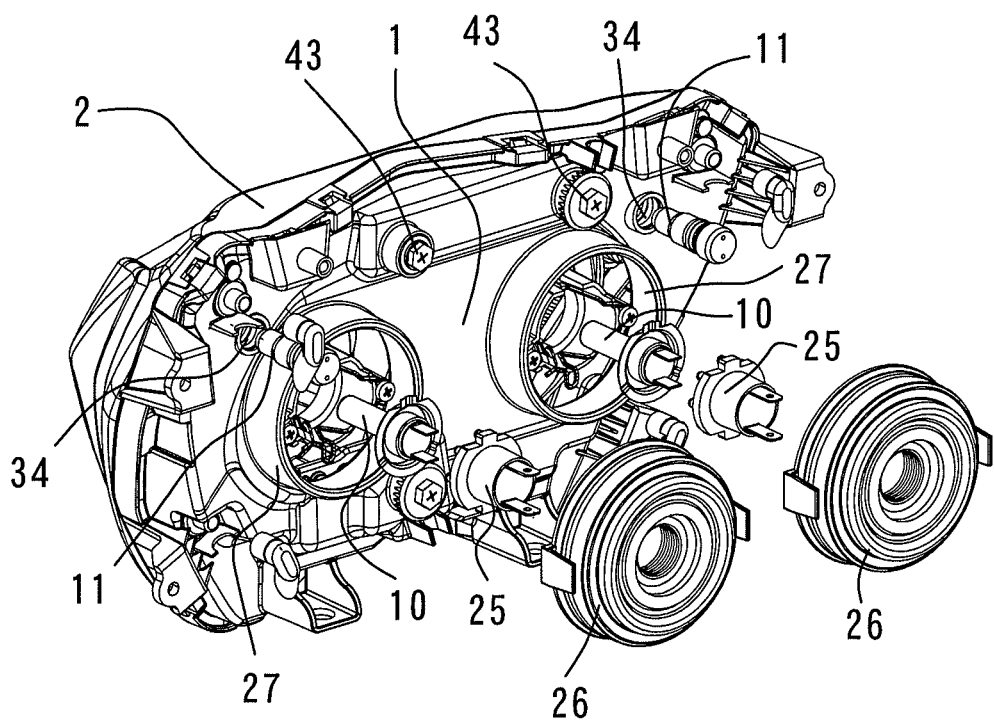
FIG. 6 is a rear perspective view of the head lamp unit in which head lamp emitters and position lamp emitters are removed.

FIG. 6 is a perspective view showing a state where the head lamp emitters 10 and the position lamp emitters 11 are taken out from the housing. At the time of assembling and maintenance, the head lamp emitters 10 and the position lamp emitters 11 are inserted from the emitter mounting holes 27 and 34 formed in the lamp body 1 into the housing to be fixed into the emitter mounting holes 27 and 34. Then, the rear end threads of the position lamp emitters 11 are directly screwed into the emitter mounting holes 34, and the mounting covers 26 of the head lamp emitters 10 are screwed into the emitter mounting holes 27.

In FIG. 4, each of the head lamp emitters 10 inserted into the housing extends through the emitter insertion hole 23 in the head lamp reflector 12 to project into the head lamp reflector 12. On the other hand, in FIG. 3, the position lamp emitters 11 extend through the emitter mounting holes 34 in the first reflection surfaces 31 of the design cover 13 to project into the first reflection surfaces 31.

[Effects of the Embodiment]

(1) As shown in FIG. 2, the position lamp emitters 11 are hidden by the head lamp reflector 12 so as not to be seen from the front. Therefore, the position lamp emitters 11 can be prevented from being noticeable in the housing of the head lamp unit to improve the appearance, seen from the front. In addition, the space behind the left upper end and the right upper end of the head lamp reflector 12 in the housing can be effectively used for arranging the position lamp emitters 11. Therefore, the left-right width of the head lamp unit can be reduced.

(2) As shown in FIG. 2, as the position lamp reflection surface, the first reflection surfaces 31 and the second reflection surfaces 32 are formed on the design cover 13 which covers the gap between the outer peripheral edge of the head lamp reflector 12 and the outer peripheral end of the lamp body 1 from the front. Therefore, the number of position lamp reflector components can be reduced. In addition, it is unnecessary to provide position lamp cut (refracting portion) in the cover lens 2.

(3) As shown in FIG. 7, even when each of the position lamp emitters 11 is hidden by the head lamp reflector 12, the cooperation of each of the first reflection surfaces 31 in cup shape (curved surface shape) and each of the second reflection surfaces 32 in plane shape can guide a light and a reflected light from the position lamp emitter 11 toward the front and obliquely inward of the range of the head lamp reflector 12. Therefore, the position lamp function can be sufficiently exerted.

(4) In FIG. 3, the left and right head lamp emitters 10 and the left and right position lamp emitters 11 are arranged, the position lamp emitters 11 being arranged behind the left and right ends of the head lamp reflector 12. Therefore, the left-right dimension of the head lamp unit which houses the position lamps can be reduced.

(5) In FIG. 3, the regions located on the back surfaces 12b at the left upper end and the right upper end of the head lamp reflector 12 and hiding the position lamp emitters 11 from the front have mirror surfaces. Therefore, lights reflected from the back surfaces 12b to the rear can be used as lights for the position lamps to improve the utilization efficiency of the lights from the position lamp emitters 11.

(6) In FIG. 3, the position lamp emitters 11 are not fixed to the head lamp reflector 12. Therefore, the head lamp reflector 12 is shifted and adjusted by the adjust bolts 43 for aiming by a small force since the position lamp emitters 11 are not fixed.

(7) The cooperation of the first reflection surfaces 31 in cup shape and the second reflection surfaces 32 in plane shape guides lights from the position lamp emitters 11 toward the front and inward of the head lamp reflector 12. Therefore, it is unnecessary to provide position lamp cut in the cover lens 2. In addition, the processing of the cover lens 2 cannot be complicated and the surface thereof becomes smooth, thereby reducing air resistance.

(8) The folded portions 12c which cover the position lamp emitters from the obliquely front are formed at the left upper edge and the right upper edge of the head lamp reflector 12. Therefore, the appearance from the obliquely front top can be improved.

(9) In FIG. 1, the regions of the cover lens 2 opposite to the position lamp emitters 11 are smoothly continuous along the extension surfaces in the regions thereof opposite to the head lamp emitters 10, and the cover lens 2 has a uniform thickness in its entirety. Therefore, it is unnecessary to refract a light by the cover lens 2. This makes the processing of the cover lens easy. In addition, air resistance can be reduced.

(10) The design cover 13 covers the periphery of the head lamp reflector 12. Therefore, as compared with the configuration in which the front surface of the head lamp unit is covered only by the head lamp reflector, the area of the head lamp reflector 12 can be smaller for size reduction.

(11) The second reflection surfaces 32 for the position lamps have the portions located to the front of the head lamp reflector 12. Therefore, reflected lights from the position lamp emitters 11 can be guided to the front of the vehicle and to the center in the vehicle width direction.

(12) Seen from the front, the design cover 13 and the head lamp reflector 12 are spaced from each other. Therefore, even when the forward-emitting direction of the head lamps is changed, the interference between the design cover 13 and the head lamp reflector 12 can be prevented.

[Other Embodiments]

(1) In the embodiment, a pair of head lamps and a pair of position lamps are housed in one housing, but the present invention is applicable to a head lamp unit which houses a single head lamp and a single position lamp in one housing.

(2) The present invention is applicable to a head lamp unit in which position lamp emitters are arranged above or below head lamp emitters.

(3) In the embodiment, the outer periphery of the lamp body and the head lamp reflector has a W-shape, but can have a triangle shape or a trapezoidal shape which spreads upward.

(4) In the embodiment, the left and right position lamp emitters are arranged on left and right upper positions of the head lamp reflectors. However, the present invention is not limited to the arrangement, and the left and right position lamp emitters may be arranged in other positions as long as they can be hidden by the head lamp reflector, seen from the front. For instance, various positions, such as the center position in the left-right direction, the left lower end position, and the right lower end position, are applicable.

(5) The position lamp emitters are preferably hidden in their entirety by the head lamp reflector, seen from the front. However, in the present invention, at least part of the position lamp emitters may be hidden, and the position lamp emitters may be partially exposed.

(6) The present invention is not limited to the head lamp unit for motorcycle, and is preferably applicable to other vehicles, e.g., a straddle-type four-wheel vehicle, a three-wheel vehicle, and a PWC (personal water craft), which have a small vehicle width.

(7) The present invention is not limited to the configuration of the embodiment, and various modification examples contemplated in the scope without departing from the contents described in the claims are included.

What is claimed is:

1. A head lamp unit for a vehicle comprising:
a housing;
a head lamp emitter housed in the housing;
a head lamp reflector housed in the housing;
a position lamp emitter housed in the housing and hidden by the head lamp reflector when viewed from a front of the housing, the head lamp reflector having a mirror-finished back surface configured to reflect in a rearward direction forward-traveling light emitted from the position lamp emitter; and
a position lamp reflection surface arranged around the head lamp reflector and being separate from the head lamp reflector, the position lamp reflection surface being configured to reflect light received directly from the position lamp emitter toward the front of the housing, and to reflect light reflected from the mirror-finished back surface of the head lamp reflector toward the front of the housing.

2. The head lamp unit for a vehicle according to claim 1, wherein the position lamp reflection surface comprises a first reflection surface and a second reflection surface, the second reflection surface being adjacent to an outward edge of the first reflection surface in both the left direction and the right direction.

3. The head lamp unit for a vehicle according to claim 1, wherein the position lamp reflection surface comprises a first reflection surface and a second reflection surface, the second reflection surface being arranged outside the first reflection surface in the vehicle width direction and extending in the vertical direction.

4. The head lamp unit for a vehicle according to claim 1, wherein the mirror-finished back surface of the head lamp reflector comprises a visor of the position lamp emitter.

5. The head lamp unit for a vehicle according to claim 1, wherein folded portions are formed at outer peripheral ends of the left upper end and the right upper end of the head lamp reflector, the folded portions being configured to hide the position lamp emitter from being viewed from the front and from the top.

6. The head lamp unit for a vehicle according to claim 1, wherein the housing includes a lamp body and a cover lens mounted on a front surface of the lamp body, and the position lamp emitter is secured to the lamp body.

7. The head lamp unit for a vehicle according to claim 1, further comprising a design cover arranged in the housing and configured to cover a periphery of the head lamp reflector from the front of the housing, the design cover being having the position lamp reflection surface thereon.

8. The head lamp unit for a vehicle according to claim 1, wherein the head lamp emitter is a left head lamp emitter, the head lamp unit further comprising a right head lamp emitter housed in the housing, the position lamp emitter being a left position lamp emitter, the head lamp unit further comprising a right position lamp emitter housed in the housing, the left position lamp emitter and right position lamp emitter being arranged behind the left end of the head lamp reflector and the right end of the head lamp reflector, respectively.

9. The head lamp unit for a vehicle according to claim 1, wherein the position lamp reflection surface comprises:
a first reflection surface having a concave surface shape and configured to cover the position lamp emitter from the rear so as to guide a reflected light toward the front of the housing; and
a second reflection surface extending from a position adjacent to the first reflection surface, and configured to redirect a reflected light from the first reflection surface around the head lamp reflector so as to guide the reflected light inward with respect to a width of the head lamp reflector when viewed from the front of the housing.

* * * * *